United States Patent [19]

Mishima et al.

[11] Patent Number: 5,120,281
[45] Date of Patent: Jun. 9, 1992

[54] POWER TRANSMISSION BELT

[75] Inventors: Kyoichi Mishima; Toshimi Kumazaki; Masahiko Kawashima, all of Kobe, Japan

[73] Assignee: Mitsubishi Belting Ltd., Japan

[21] Appl. No.: 692,014

[22] Filed: Apr. 26, 1991

[30] Foreign Application Priority Data

May 2, 1990 [JP] Japan ................ 2-47294[U]

[51] Int. Cl.⁵ ................................. F16G 5/08
[52] U.S. Cl. ....................... 474/263; 474/268
[58] Field of Search ............ 474/237, 238, 260, 261, 474/263, 264, 268; 428/293–295, 235–239

[56] References Cited

U.S. PATENT DOCUMENTS

| | | | |
|---|---|---|---|
| 4,657,526 | 4/1987 | Tangorra et al. | 474/263 X |
| 4,773,895 | 9/1988 | Takami et al. | 474/263 X |
| 4,798,566 | 1/1989 | Sedlacek | 474/238 |

FOREIGN PATENT DOCUMENTS 1-109636  6/1989  Japan .

Primary Examiner—Thuy M. Bui
Attorney, Agent, or Firm—Wood, Phillips, Van Santen, Hoffman & Ertel

[57] ABSTRACT

A power transmisison belt having: at least one longitudinally extending rib having laterally spaced, first and second oppositely facing surfaces for reception within a complementary pulley groove; at least one fiber embedded in the one rib and having a length extending transversely to the longitudinal extent of the one rib, with the fiber having a portion projecting outwardly from the one rib beyond one of the first and second surfaces; and a noise suppressing material applied to the one of the first and second surfaces and a portion of the one fiber to inhibit noise generation between a power transmission belt and a cooperating pulley resulting from relative movement of one against the other.

21 Claims, 1 Drawing Sheet

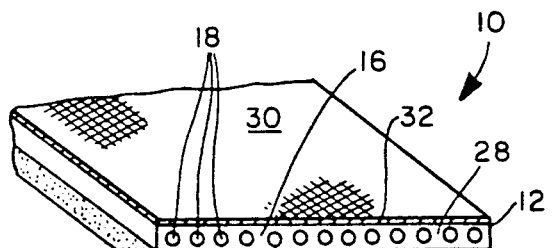
FIG.1
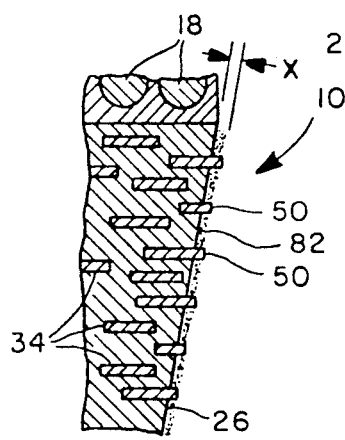
FIG.2
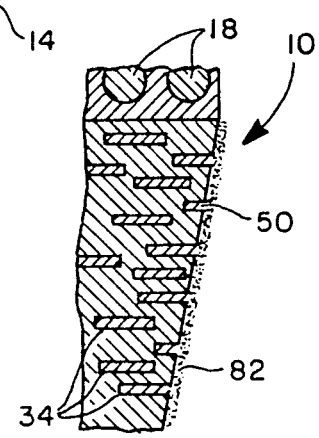
FIG.3
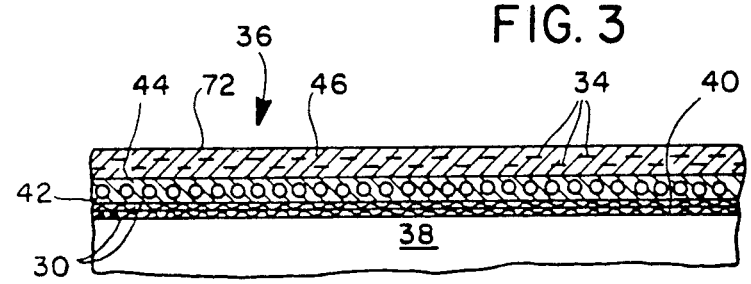
FIG.4
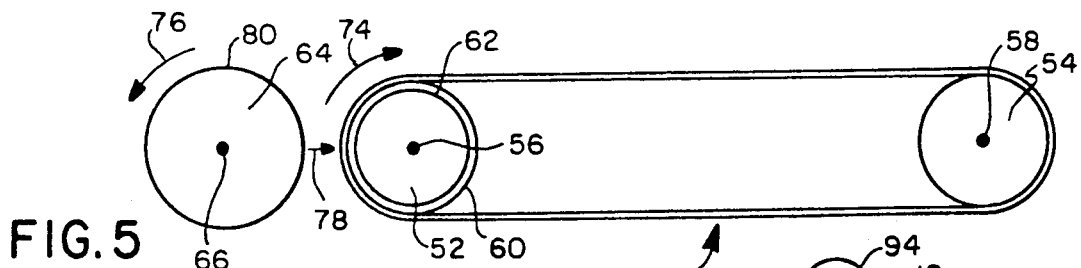
FIG.5
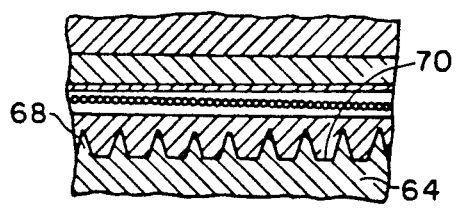
FIG.6
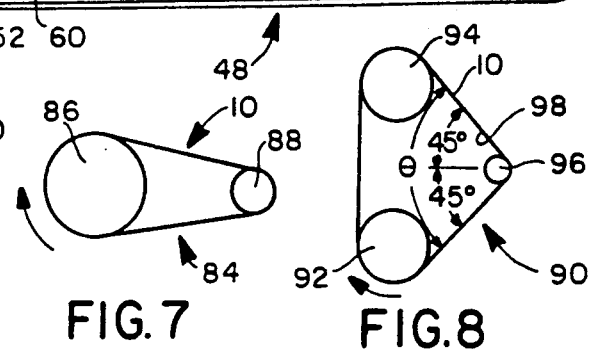
FIG.7
FIG.8

POWER TRANSMISSION BELT

BACKGROUND OF THE INVENTION

1. Field of the Invention

This invention relates to power transmission belts and, more particularly, to a power transmission belt with a material, on the driving surfaces thereof, to suppress noise normally generated by impact and relative movement between the belt and a cooperating pulley.

2. Background Art

Raw edged V-belts, V-ribbed belts, and other types of belts on which a plurality of V-shapes extend longitudinally of the belt, are used in a variety of different environments to transmit up to relatively large forces. These belts have V-shaped ribs with compression sections having surfaces that engage facing pulley surfaces defining receptive grooves for the ribs. Some of the salient features of, and problems with, the above belts will be discussed below.

V-ribbed belts are generally thinner than a conventional V-belt. Resultingly, these belts are quite flexible and can be wrapped around relatively small diameter pulleys to enable a compact overall system to be designed. The flexibility of this type of belt contributes to overall system energy savings. Further increased energy savings and prolonged life are attributable to the way in which the V-ribbed belt cooperates with the pulleys about which it is trained. The individual ribs do not move into the cooperating pulley grooves as deeply as does the rib on a conventional V-belt. The result is that there are less frictional losses as the ribs enter into and come out of the pulley groove, and less tension decay on the belt during operation. This adds considerably to the life of the belt and has made such belts highly useful in many diverse environments, including, for example, the automotive, agricultural and domestic electric implement fields.

One drawback of V-ribbed belts is that in environments in which excessive load is applied to the belts, the belts may slip easily relative to the cooperating pulleys. The slippage may cause excessive and/or uneven wear, cracking, chunking of rib rubber, etc., which shortens the belt life.

Another problem with V-ribbed belts, as well as other types of transmission belts, is the problem of noise generation. Belt noise in a transmission system results from several different causes. First, there is noise that is generated between the belt and pulley, as the belt slips circumferentially with respect to the pulley, as when the belt is operated under high load/high torque conditions. Stick-slip noise is also generated between the belt and pulley and results from relative radial movement between the belt and pulley as the belt is engaged in and disengaged from the pulley.

This latter problem is caused by pulley vibrations self-excited by the belt, particularly at start-up. Oscillatory vibration is a phenomenon in which the belt is rubbed against the pulley under a constant frequency of vibration, with the resulting vibrations being converted to noise resulting when the frequency of belt vibrations are tuned to the natural frequency of the pulley. This problem is most prominent at start-up. This problem results from the increased tension that is applied to the belt at start-up. Once the system is in normal operation, typically the belt tension is dropped to 40 to 50% of that which it was at start-up. Once tension decay occurs, the noise is naturally eliminated.

Various methods have been devised by prior art designers to minimize noise generation, which is a problem encountered in virtually all systems in which there are cooperating ribs and grooved pulleys. One proposed solution has been to cover the driving/driven surfaces of the belt with cloth. This method results in improved noise suppression and improves the wear resistance of the rubber defining the driving/driven surfaces of the belt. However, the drawback with this method is that it is inherently difficult during manufacture to apply the cloth to the rib surfaces. This problem is particularly vexatious with a small rib construction. Still further, the cloth to some degree minimizes the flexibility of the belt. The cloth may fail before the end of the normal anticipated life of the belt without the cloth.

Another proposed solution to the noise generation problem has been to blow short staple reinforcing fibers against the exposed driving/driven surfaces of the belt. While the fibers are easier to apply than a cloth layer, the fibers dispersed on the surfaces of the belt tend to readily fall off the belt, particularly in high torque systems. The result may be an irregular disposition of the fibers on the surfaces, which alters the operating characteristics of the belt and compromises its noise suppression capability. The bending characteristics of the belt may also be altered which may decrease the useful life thereof.

A third method of suppressing noise generation is to embed a canvas layer in the belt ribs. The principal drawback with this construction is that the belt manufacture is difficult and requires a high degree of skill. Manufacture is particularly a problem when the ribs are small.

SUMMARY OF THE INVENTION

The present invention is specifically directed to overcoming the above-enumerated problems in a novel and simple manner. More particularly, it is an object of the invention to provide a power transmission belt which suppresses noise normally generated in belt/pulley systems without reducing power transmission capability and to make such a system suitable for a high load/high torque system.

More particularly, the present invention contemplates a power transmission belt having: at least one longitudinally extending rib having laterally spaced, first and second oppositely facing surfaces for reception within a complementary pulley groove; at least one fiber embedded in the one rib and having a length extending transversely to the longitudinal extent of the one rib, with the fiber having a portion projecting outwardly from the one rib beyond one of the first and second surfaces; and a noise suppressing material applied to the one of the first and second surfaces and a portion of the one fiber to inhibit noise generation between a power transmission belt and a cooperating pulley resulting from relative movement of one against the other.

The noise suppressing material provides a cushion layer between the surfaces of the belt and a cooperating pulley to thereby prevent noise generation resulting from both relative radial and circumferential movement between the belt and cooperating pulley.

The portion of the one fiber has a free end that projects a first distance away from the one of the first and second surfaces. The thickness of the noise suppressing material on the one of the first and second surfaces in the vicinity of the one fiber is approximately equal to the first distance.

In a preferred form, the belt has a tension section and a compression section and the noise suppressing material has a substantially uniform thickness over the extent of the compression section on the one of the first and second surfaces. This accounts for consistent belt operation and noise suppression characteristics.

In one form, the fiber has a flared free end and the flared free end is at least partially embedded in the noise suppressing material. Flaring of the ends increases the effective surface area of the fiber to enhance the drive characteristics of the one surface. In one form of the invention, discrete yarns are embedded in the compression section of the belt and extend transversely to the longitudinal extent of the one rib and have a portion projecting outwardly from the one rib beyond one of the first and second surfaces. The yarns, as the fibers, can be either straight or flared at the free end thereof. In one form, the fibers are synthetic fibers made from at least one of nylon, polyvinyl alcohol, polyester, and aromatic polyamide. In another form of the invention, the yarns are made from a mixture of natural fibers made from at least one of cotton and pulp, with synthetic fibers, made of at least one of nylon, polyvinyl alcohol, polyester and aromatic polyamide.

Preferably, the noise suppressing material is at least one of talc, calcium carbonate, clay and silica, and preferably applied in powder form.

The noise suppressing material is applied to the belt surface(s) in an amount between $2.5 \times 10^{-4}$ and $120 \times 10^{-4}$ g/cm$^2$ of the belt surface. By having the noise suppressing material completely embedding the fibers/yarns, the fibers/yarns provide a firm foundation for the noise suppressing material to prevent separation thereof from the belt surfaces. At the same time, the noise suppressing material reinforces the fibers/yarns in an operative position.

In a preferred form, the belt surfaces are defined at least partially by at least one of natural rubber (NR), styrene-butadiene rubber (SBR), and chloroprene rubber (CR).

The fibers/yarns are embedded in the belt rubber in the compression section thereof in a ratio of between 5-30 parts by weight of fibers to 100 parts by weight of rubber.

The fibers/yarns in a preferred form, have a length between 3-10 mm.

The fibers/yarns are preferably exposed at each of the side surfaces of the rib. In the event of multiple ribs, preferably each of the surfaces of the ribs has a plurality of fibers/yarns extended therethrough.

BRIEF DESCRIPTION OF THE DRAWINGS

FIG. 1 is a fragmentary perspective view of a V-ribbed belt with noise suppressing structure according to the present invention incorporated therein;

FIG. 2 is an enlarged, fragmentary, cross-sectional view of one of the ribs on the belt in FIG. 1 with one form of noise suppressing structure according to the present invention incorporated therein;

FIG. 3 is a view as in FIG. 2 with a modified form of noise suppressing structure according to the present invention incorporated therein;

FIG. 4 is a fragmentary, cross-sectional view of a belt sleeve in an upside down position on a forming drum;

FIG. 5 is a schematic, side elevation view of a system cutting ribs in the belt sleeve of FIG. 4;

FIG. 6 is an enlarged cross-sectional view of a rib forming grinding wheel operatively engaged with the belt sleeve of FIG. 5;

FIG. 7 is a schematic representation of a system for testing belt noise generation; and FIG. 8 is a schematic representation of a system for testing belt power transmission capability.

DETAILED DESCRIPTION OF THE DRAWINGS

In FIG. 1, a V-ribbed belt, made according to the present invention, is shown at 10. It should be understood initially that while the invention is described with respect to a V-ribbed belt 10, the invention is applicable to any belt which has a rib to engage the surfaces of a drive/driven pulley. The belt 10 has an upper tension section 12, a lower compression section 14, and a neutral section 16 between the tension section 12 and compression section 14 and defined by a plurality of longitudinally extending tensile cords 18. The compression section 14 has V-shaped cutouts 20 therein defining laterally spaced, elongate teeth 22, each having inclined, oppositely facing flat surfaces 24, 26 for reception within complementary grooves (not shown) on a pulley (not shown), which drives or is driven by the belt 10. The teeth 22 are made preferably from adhesive rubber made from one or a combination of natural rubber (NR), styrene-butadiene rubber (SBR), chloroprene rubber (CR), or the like.

The tensile cords 18 are embedded in an adhesive rubber layer 28, made preferably from the same material as the teeth 22. The tensile cords 18 themselves are made preferably of low elongation, high strength ropes made of polyester, nylon, aromatic polyamide fiber, or the like. At least one rubber coated canvas layer 30, with woven weft and warp cotton yarns, is adhered to the outer surface 32 of the adhesive rubber layer 28.

A plurality of discrete fibers/yarns 34 are embedded in the belt compression section 14. The fibers/yarns 34 are substantially laterally directed within the belt teeth 22. The fibers/yarns 34 are made either from synthetic fiber material, such as nylon, Vinylon TM (trademark for polyvinyl alcohol fiber), polyester, aromatic polyamide, etc. or a mixture of natural fibers, such as cotton, pulp, etc. in a predetermined ratio with the synthetic fibers. The length of the fibers/yarns 34 is preferably in the range of 3-10 mm. Preferably, the fibers/yarns 34 are provided in the ratio of 5-30 parts by weight to 100 parts by weight of rubber.

In FIG. 4, a section of a belt sleeve 36 is shown, from which individual belts 10 can be severed. The individual belt components are assembled over a molding drum 38 in upside down arrangement. The canvas layer 30 is initially placed against the outer surface 40 of the molding drum 38. The FIG. 4 belt construction employs two such canvas layers 30. These layers 30 are arranged so that the expansion and contraction direction for the canvas 30 is aligned with the length of the belt 10.

One sheet 42 of the adhesive rubber layer 28 is applied to the innermost canvas layer 30 after which the tensile cords 18 are wrapped therearound. A separate inner rubber sheet 44 is then placed over the cords in the outer sheet 42. A compression rubber sheet 46, having a thickness greater than the adhesive rubber layer 28, is then placed over the inner rubber sheet 44. The compression rubber sheet 46 has the fibers/yarns 34 embedded therein.

The resulting sleeve 36, which is cylindrical in form, is then vulcanized by known pressurizing and heating means and methods and thereafter removed from the molding drum 38, from where it is transferred to a system, as at 48 in FIG. 5, on which the individual belts 1? are separated out by grinding the sleeve 36.

The individual belts 10 are severed, according to the invention, in two different manners to produce two different structures, as shown in FIGS. 2 and 3. In FIG. 2, the individual fibers/yarns 34 project away from the flat surface 26 a distance X in FIG. 2 and are cleanly severed in a vertical direction so that the free ends 50 have an exposed laterally facing surface area substantially equal to the cross-sectional area of the remainder of the fiber/yarn 34.

Alternatively, the belt fibers/yarns 34 in FIG. 3 have their free ends 50 flared. To achieve this flaring, the individual belts 10 are cut in the manner described below with respect to FIGS. 5 and 6. The system 48 consists of a drive drum 52 and a driven drum 54 arranged in spaced relationship for rotation about parallel axes, 56, 58, respectively. A protective sleeve 60 surrounds the drive drum 52 to protect the outer surface 62 thereof and define a cushioned backing member for a rotatable cutting/polishing wheel 64. The protective sleeve 60 is readily removable to allow its replacement. The cutting/polishing wheel 64 is rotatable about an axis 66 that is parallel to the axes 56, 58.

The cutting/polishing wheel 64 has a plurality of circumferential cutting teeth/edges 68, each having an inverted V-shaped cross section. The cutting edges 68 are arranged and configured to define the belt teeth 22, which is completed upon the cutting edges 68 penetrating the belt sleeve 36 to a depth at which the root 70 between adjacent cutting edges 68 encounters the outermost sleeve edge 72.

The cutting/polishing wheel 64 is rotatable preferably oppositely to the direction of rotation of the drive wheel 52. As seen in FIG. 5, with the drive wheel rotated in the direction of arrow 74 about its axis 56, the cutting/polishing wheel 64 rotates oppositely in the direction of arrow 76. The invention also contemplates that the belt sleeve 36 and cutting/polishing wheel 64 could be rotated in the same direction during a cutting operation. As the relative rotation is effected between the cutting/polishing wheel 64 and the belt sleeve 36, the cutting/polishing wheel 64 is moved gradually in the direction of arrow 78 towards and against the moving belt sleeve 36.

To produce the flared fiber/yarn configuration in FIG. 3, the cutting proceeds in two steps. During the first step, the outer edge 80 of the cutting/polishing wheel 64 is rotated at least 15 meters per second. The outer edge 72 of the sleeve 36 is preferably rotated oppositely at a speed of at least 0.07 meters per second. The cutting/polishing wheel 64 is advanced towards and against the belt sleeve 36 at a speed of at least 0.3 mm per minute.

This procedure is carried out until the cutting/polishing wheel 64 is within 0.5 to 1 mm of its final position. The circumferential speed of the outer edge 80 of the cutting/polishing wheel is then reduced to 15 meters per second or less, the rotational velocity of the outer edge 72 of the sleeve 36 is reduced to 0.07 meters per second or less, and the cutting/polishing wheel is advanced to its final position at a rate of 0.3 mm per minute or less.

Preferably, the surface roughness of the cutting edges 68 is 80 to 200 mesh and preferably in the range of 100 to 120 mesh during both system operating speeds.

The invention contemplates that after the individual teeth 22 are formed and the individual belts 10 separated from the sleeve 36, the surfaces 24, 26 of the belt 10 be treated with a powder-like noise suppressing material 82 (FIGS. 2 and 3). Preferably, the noise suppressing material 82 is one of talc, calcium carbonate, clay and silica, which is uniformly applied to the surfaces 24, 26 in the compression section 14 of the teeth 22 to a depth preferably about equal to the distance X of projection of the exposed portions of the fibers/yarns 34 from the flat surfaces 24, 26. The exposed portions of the fibers/yarns 34 thus become embedded in the material 82. The fibers/yarns 34 act as a reinforcement for the material 82 to prevent separation thereof from the surfaces 24, 26. In the FIG. 3 construction, the depth/thickness of the material 82 is preferably sufficient to completely cover the flared ends 50 of the fibers/yarns 34.

In an exemplary embodiment of the invention, a known V-ribbed belt, identified by number 5PK1104 and having five ribs and 1000 mm of belt length, is preferably provided with 0.1-5 g of noise suppressing material 82 per belt. It has been found that an amount less than 0.1 g will ineffectively suppress noise whereas an amount more than 5 g results in insufficient power transmission capability during operation due to a decrease in the frictional coefficient of the belt.

The 0.1 to 5 g per 1000 mm×5 ribs of noise suppressing material 82 is preferred for a V-ribbed belt, such as that shown in FIG. 1. As a general rule, in the case of a V-belt, a raw edge V-belt, or a banded V-belt, the noise suppressing material 82 is provided in the range of $2.5 \times 10^{-4}$ to $120 \times 10^{-4}$ g/cm$^2$.

Preferably, the noise suppressing material is in powder form and is applied by means of spraying or brush coating. The material 82 is reinforced/supported by the projecting fibers/yarns 34 which become preferably fully coated by the material 82. The material 82 tends to work itself into the flared end 50 of the exposed portions of the fibers/yarns 34.

The excellent operating characteristics of the inventive belt, in terms of noise suppression and transmission capability, are demonstrated below through a description of two different tests.

Test No. 1 - Sound Suppression

The system 84 in FIG. 7 was used to test three different belts A, B, C. Each belt A, B, C was a five ribbed V-belt identified by the number 5PK1104. Each belt A,B,C had short staple fibers/yarns 34 therein with flared ends as those in the belt shown in FIG. 3. The belts, as shown in the attached Table 1, were tested with and without noise suppressing material on the driving surfaces 24, 26 thereon.

Each of the three belts A,B,C was in turn trained around a drive pulley 86 having a 167.9 mm diameter and a driven pulley 88 having a diameter 72.0 mm. The belt tension applied to each belt was 33 kg per rib.

Acceleration Test

Each belt was run for 30 minutes with the drive pulley operating at 2000 rpm and the driven pulley torque being 1.25 Kg-m and the tension tested.

Sound Production Test

Each belt was tested with the drive pulley 86 operating at 600 rpm with there being no load on the driven pulley 88.

As can be seen from the results in Table 1, the noise suppressing material 82 substantially eliminated all detectable noise during operation.

TABLE 1

| Belt Sample | Noise Suppression Material Amount | Mounting Tension | Tension at 2000 rpm After 30 Minutes | Sound Production Result | Adhesive Particles |
|---|---|---|---|---|---|
| A | None | 167 kg/5 ribs | 120 kg/5 ribs | low sound | 3/(3-4) mm in length |
| B | 0.5 g | 167 kg/5 ribs | 120 kg/5 ribs | no sound | none |
| C | 4.0 g | 167 kg/5 ribs | 120 kg/5 ribs | no sound | none |

Test No. 2

A test setup, as shown at 90 in FIG. 8, was used to test power transmission horsepower for three different belts, with each being the model 5PK1104 V-ribbed belt. Each belt A,B,C was trained about a drive pulley 92, having a 20 mm diameter, and a driven pulley 94, also having a 120 mm diameter. A tensioning pulley 96 located midway between the drive and driven pulleys 92, 94 was urged against the back side 98 of the belt 10 to thereby produce an initial bend angle $\theta$ of 90°.

The tension on the belt was varied continuously from 5 kg/rib to 18 kg/rib with the drive pulley 92 operating at 2000 rpm. The slip rate of the belt 10 was measured as the belt tension was changed.

TABLE 2

| | Tension | Belt A (with no noise suppressing material) | Belt B (0.5 g of noise suppressing material) | Belt C (4.0 g of noise suppressing material) |
|---|---|---|---|---|
| Torque at 1% of slip (kg:m) | 5 kg/rib | 1.44 | 1.55 | 1.72 |
| | 18 kg/rib | 3.34 | 3.48 | 3.34 |

The results of the test are described in Table 2. Surprisingly, the power transmission capability of the belt 10 did not diminish by reason of the application of the noise suppressing material 82.

Because the material is positively adhered to the fibers/yarns 34, the transmission characteristics of the belt remains substantially the same throughout the normal anticipated belt life, i.e. the frictional coefficient between the belts and pulleys remaining constant, resulting in s smooth and quietly running belt.

The foregoing disclosure of specific embodiments is intended to be illustrative of the broad concepts comprehended by the invention.

We claim:

1. A power transmission belt comprising:
at least one longitudinally extending rib having laterally spaced, first and second oppositely facing surfaces for reception within a complementary pulley groove;
at least one fiber embedded in the one rib, having a length extending transversely to the longitudinal extent of the one rib, and having a portion projecting outwardly from the one rib beyond one of said first and second surfaces; and
a noise suppressing material applied to the one of the first and second surfaces and the portion of the one fiber to inhibit noise generation between the power transmission belt and a cooperating pulley resulting from relative movement of the transmission belt and a cooperating pulley, one against the other.

2. The power transmission belt according to claim 1 wherein the portion of he one fiber has a free end that projects a first distance away from the one of the first and second surfaces and the thickness of the noise suppressing material on the one of the first and second surfaces in the vicinity of the one fiber is approximately equal to the first distance.

3. The power transmission belt according to claim 2 wherein the power transmission belt has a tension section and a compression section, and the noise suppressing material has a substantially uniform thickness on the one of the first and second surfaces in the compression section of the belt.

4. The power transmission belt according to claim 1 wherein the portion of the fiber has a flared free end and the flared free end is at least partially embedded in the noise suppressing material.

5. The power transmission belt according to claim 4 wherein the flamed free end of the one fiber or completely embedded in the noise suppressing material.

6. The power transmission belt according to claim 1 wherein there are a plurality of laterally extending fibers projecting through and outwardly of each of the first and second surfaces and the noise suppressing material is applied to each of the first and second surfaces and the portions of a plurality of the fibers projecting outwardly of each of the first and second surfaces.

7. The power transmission belt according to claim 6 wherein the belt rib is defined by a rubber material and the fibers are embedded in the belt tooth in a ratio of between 5 to 30 parts by weight of fibers to 100 parts by weight of rubber.

8. The power transmission belt according to claim 1 wherein the noise suppressing material is a powder.

9. The power transmission belt according to claim 1 wherein the noise suppressing material is applied to the one of the first and second surfaces in an amount between $2.5 \times 10^{-4}$ and $120 \times 10^{-4}$ g/cm² per unit area of the one of the first and second surfaces.

10. The power transmission belt according to claim 1 wherein the noise suppressing material comprises at least one of talc, calcium carbonate, clay and silica.

11. The power transmission belt according to claim wherein the fiber has a length of between 3 to 10 mm.

12. The power transmission belt according to claim 1 wherein the power transmission belt has a plurality of longitudinally extending ribs.

13. A power transmission belt comprising:
at least one longitudinally extending rib having laterally spaced, first and second oppositely facing surfaces for reception within a complementary pulley groove;
a plurality of discrete fiber yarns each extending transversely to the longitudinal direction of the one rib and having a portion projecting outwardly from the one rib beyond one of said first and second surfaces; and
a noise suppressing material applied to the one of the first and second surfaces and the portions of a plurality of the yarns to inhibit noise generation between the power transmission belt and a cooperating pulley resulting from relative movement of the transmission belt and a cooperating pulley, one against the other.

14. The power transmission belt according to claim 13 wherein each of a plurality of discrete fiber yarns extends through only one of the first and second surfaces.

15. The power transmission belt according to claim 13 wherein the fiber yarns have a length of between 3 to 10 mm.

16. The power transmission belt according to claim 13 wherein the portions of a plurality of discrete fiber yarns have a free end that is flared to increase the effective exposed surface area of the fiber yarns over what it would be in the absence of the flaring.

17. The power transmission belt according to claim 13 wherein the noise suppressing material comprises at lest one of talc, calcium carbonate, clay and silica.

18. The power transmission belt according to claim 13 wherein the noise suppressing material is applied to the one of the first and second surfaces in an amount between $2.5 \times 10^{-4}$ and $120 \times 10^{-4}$ g/cm$^2$ per unit area of the one of the first and second surfaces.

19. The power transmission belt according to claim 13 wherein the first and second surfaces are defined at least partially by at least one of natural rubber (NR), styrene-butadiene rubber (SBR), and chloroprene rubber (CR).

20. The power transmission belt according to claim 13 wherein the fibers are synthetic fibers made from at least one of nylon, polyvinyl alcohol, polyester and aromatic polyamide.

21. The power transmission belt according to claim 13 wherein the yarns are made from a mixture of natural fibers made from at least one of cotton and pulp with synthetic fibers made of at least one of nylon, polyvinyl alcohol, polyester, and aromatic polyamide.

* * * * *